March 10, 1959 G. E. WHITNEY 2,877,449

INTERMEDIATE MAGNETIC CORE STORAGE

Filed Jan. 2, 1953 3 Sheets-Sheet 1

INVENTOR.
GORDON E. WHITNEY

BY

Wm. V. Schelberg
AGENT

INVENTOR.
GORDON E. WHITNEY

BY Wm. V. Schelberg
AGENT

March 10, 1959 G. E. WHITNEY 2,877,449

INTERMEDIATE MAGNETIC CORE STORAGE

Filed Jan. 2, 1953

3 Sheets-Sheet 3

INVENTOR.
GORDON E. WHITNEY

BY Wm. V. Schelberg
AGENT 2,877,449

INTERMEDIATE MAGNETIC CORE STORAGE

Gordon E. Whitney, Poughkeepsie, N. Y., assignor to International Business Machines Corporation, New York, N. Y., a corporation of New York Application January 2, 1953, Serial No. 329,410

18 Claims. (Cl. 340—174)

The present invention relates to accounting machines, and more particularly to machines adapted to read information from record cards into storage and then to read the information from storage as many times as desired to an indicating device.

The principal object of the invention is to provide an improved intermediate storage device involving the use of magnetic cores and utilizing the characteristic of magnetic materials to retain a particular state of magnetization having once been magnetized in a particular sense and to a degree sufficient to cause it to traverse its hysteresis loop. The advantages of such storage elements in recording binary data reside in their independence of power supply voltages, relative insensitivity to temperature and humidity, and in providing a nonvolatile yet erasable record.

A further object of the invention resides in a novel system wherein binary information stored in a magnetic storage device may be repeatedly read out and recorded in a series of duplicated records without loss of the stored information.

Other objects will be pointed out in the following description and claims and illustrated in the accompanying drawings which disclose, by way of example, the principle of the invention and the best mode which has been contemplated, of applying that principle.

In the drawings:

Figs. 1 and 2 taken together constitute a schematic diagram of the circuits and the mechanism for reading information into and out of storage devices.

Figure 2:
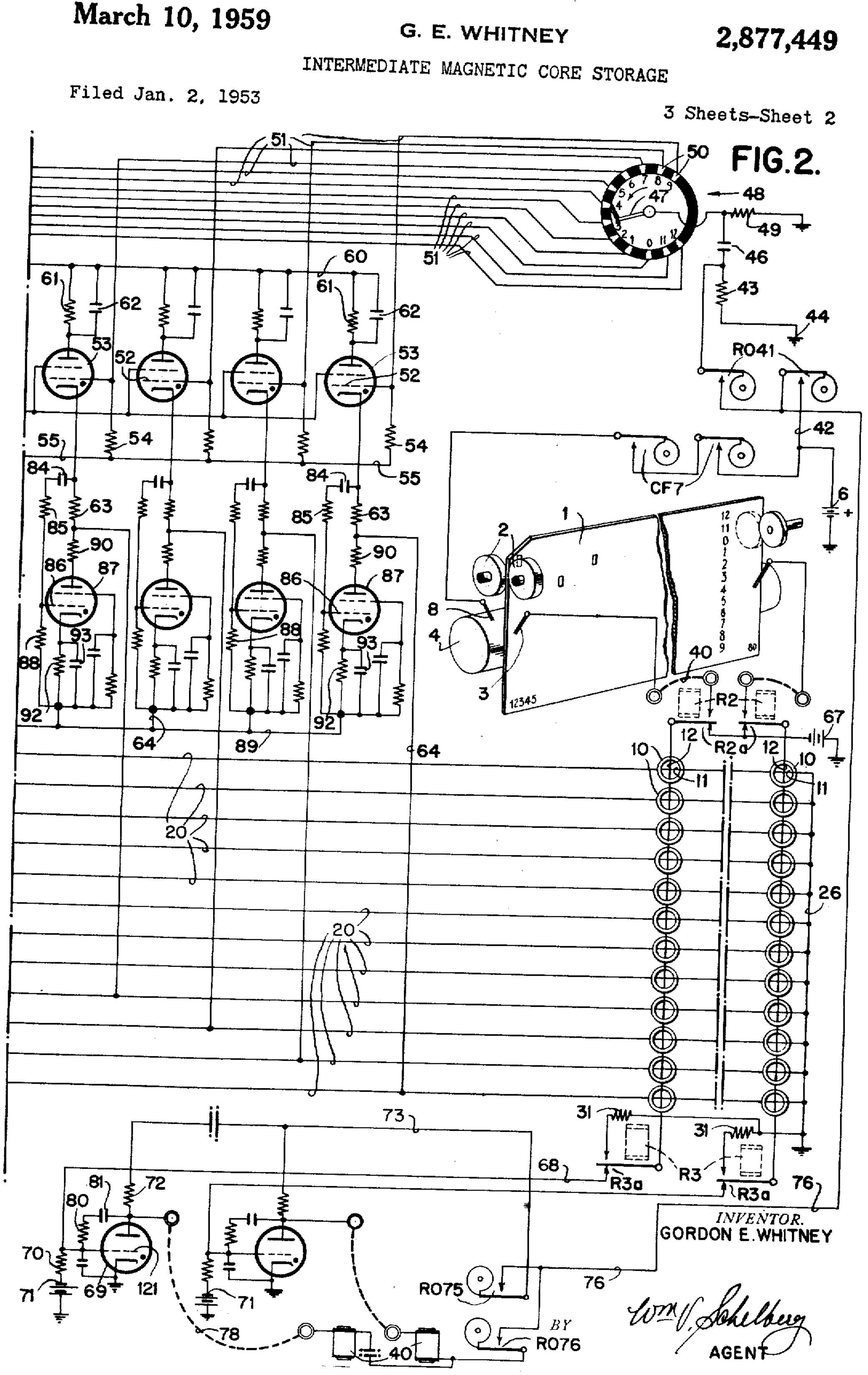

Referring to Fig. 2, it will be noted that a record card 1 of the well known type having a plurality of vertical columns with the usual ten digit representing positions designated 0 to 9 and two control positions designated 11 and 12, is advanced by feed rollers 2 past sensing brushes 3. Cards are fed in succession from a hopper (not shown) to the feed rollers and are advanced by the latter with their 9's positions first past a row of the sensing brushes 3. A brush is provided for each column on the record card, and the brushes are spaced laterally so as to sense concurrently like digit representing perforations in the different columns by making contact with a conductive roller element 4 through the perforations. Only the brushes for the first and last columns are shown in the figure to avoid duplication and unnecessary confusion. The roller element 4 is energized from a source of positive potential 6 through a pair of cam operated card feed contacts CF7 and brush 8. These cam contacts are driven synchronously with the card feed rollers 2 and serve to close the sensing circuit after the brush 3 has made contact through a perforation in a record card and to open the circuit before the brush leaves a perforation to avoid arcing at this point with consequent damage to the card as well as the brush.

Information punched in a record card is, in the above described manner, read out of the card in the form of voltage pulses appearing at the reading brush terminals with the time of appearance of a voltage pulse being indicative of the digit level and coincident with the reading of that digit level on the card.

In carrying out the principal object of the invention, the electrical impulses resulting from the sensing of the record card as described, are stored in a novel two dimensional magnetic core storage device, and, from this unit, the information may be read out at a later time either once or repeatedly as will be more fully explained hereafter.

The storage device is illustrated in Fig. 2 and consists of a plurality of magnetic annular core elements 10 arranged in columns corresponding in number to the columns of the record, for example eighty. Each column consists of a number of cores corresponding with the twelve digit and control representing positions of the record cards. Only the cores for the first and last columns are shown, since the columns are identical to each other and it is desired to avoid duplication.

Figures 3, 4, 5:
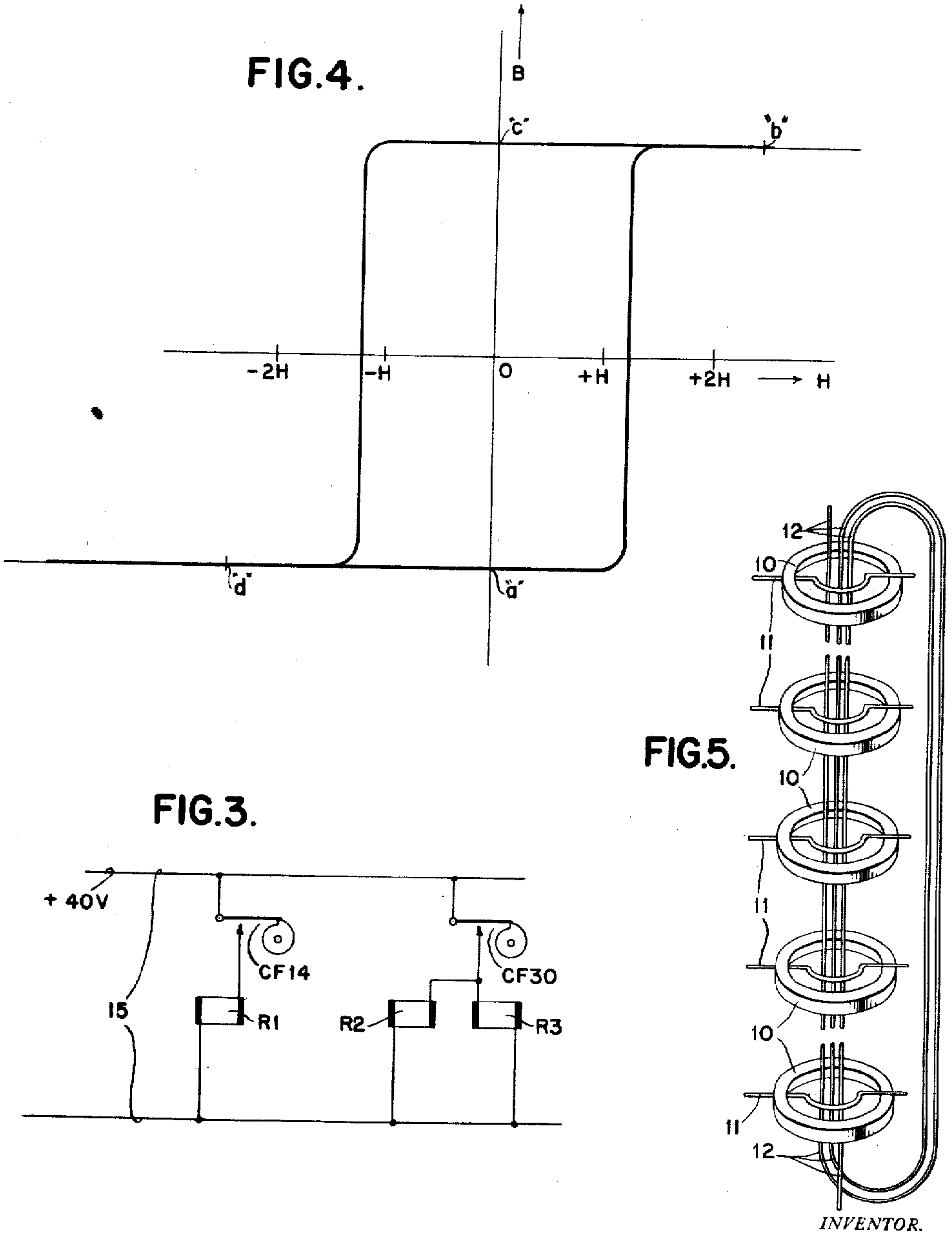
Fig. 3 shows circuits for energizing relays incorporated in the system of Figs. 1 and 2.
Fig. 4 is a representation of the hysteresis characteristic of the magnetic cores of the storage device.
Fig. 5 shows the windings for a column of cores in the storage device.

Each core is provided with a winding 11 and a winding 12, as shown in Fig. 5. The winding 11 consists of a single turn passing through all the cores in a given row representing like digit or control positions, and the winding 12 consists of a plurality of turns (for example seventy-five) passing through all the cores in a given column.

Magnetization of a core in one direction or residual state is arbitrarily chosen as a "zero" condition and in the other direction or remnance state a "one" condition. Having once been magnetized in a particular direction or state, the magnetic core will retain that stable state until application of a suitable M. M. F. in a reverse direction. Referring now to Fig. 4, if a "zero" condition is selected as core residual point "*a*" on the hysteresis loop illustrated, application of an M. M. F. of +2H will cause the core to traverse the curve to saturation point "*b*" and, on removal of the applied M. M. F., returns to residual point "*c*" which represents a stored "one." Application of an M. M. F. of +H would be insufficient to cause such a transfer, and on removal of the +H M. M. F., the core would remain at "zero." Similarly, with a "one" stored, application of an M. M. F. of −2H will cause the core to traverse its hysteresis loop from point "*c*" to a point "*a*" while an M. M. F. of −H will leave the final remnance state of the core unchanged.

Prior to read-in of any information to the storage device, it is necessary to clear it of previously stored information or restore all the cores to a "zero" state of magnetization. This is accomplished by connecting all the digit level windings 11 to a source of positive potential of such magnitude that a current flows through them establishing an M. M. F. of −2H or greater. Application of the negative M. M. F. will return each core to saturation point "*d*" and to residual point "*a*" on removal of the M. M. F.

To subject the cores to an M. M. F. of −2H, cam operated contacts CF14 (Fig. 3) close to complete a circuit from one side of a +40 volt line 15 through a restore relay R1 to the other side of the line. The restore relay is then energized to close twelve sets of normally open contacts R1*a*, shown in Fig. 1, so as to connect each of the windings 11 at the twelve digit level positions through conductors 20 to a lead 21 which may be connected, through a resistor 22 and cam contacts CF23, to a source of power 24. Closure of cam contacts CF23 completes a circuit from the positive source 24 through contacts CF23, resistor 22, lead 21, the now closed contacts R1*a*, the conductors 20 and each digit level winding 11 in parallel to a common grounded conductor 26. Upon the completion of this circuit, each of the cores 10 is subjected to an M. M. F. of −2H for shifting them to points "*d*" on their hysteresis curves. Contacts CF14 and 23 thereafter open and each core 10 of the storage unit is set at a "zero" position or residual point "*a*" on its hysteresis curve.

Contacts CF30, shown in Fig. 3, operate in synchronism with the card feed unit and are closed just before the card 1 reaches the brushes 3 to complete energizing circuits for relays R2 and R3 which close their normally open upper contacts R2*a* and R3*a* (Fig. 2) in each column of cores. The closing of these contacts connects each of the brushes 3 through the windings 12 in its corresponding column of cores 10, and a resistor 31 to ground.

A card feed emitter 32 (Fig. 1) is operated in synchronism with the advance of the card and functions to pulse the windings 11 at each digit level of the storage device at a time coincident with passage of the corresponding digit row on the record card past the reading brush station. The emitter 32 is provided with contacts 33 numbered 9 to 0, 11, 12 and connected by conductors 34 to normally closed contacts R1*b* of the relay R1. Just before the card 1 reaches the brushes 3, the cam contacts CF14 open to deenergize the relay R1 and permit the contacts R1*b* to close and the contacts R1*a* to open. An emitter brush 35 is connected through cam contacts CF36 to a negative voltage source 37, and the brush is driven to engage the contacts 33 in synchronism with the sensing of corresponding points on the card 1.

Considering the sensing of a perforation located in column 1 at the 12 position on the record card, the brush 3 enters the perforation and a circuit is completed from the conductive roller 4 through control panel wiring 40, now closed upper contact R2*a*, through winding 12 of column 1, now closed upper contact R3*a* and through resistor 31 to ground. Simultaneously, the emitter brush 35 engages the No. 12 contact 33 and a pulse is applied from the grounded conductor 26 (Fig. 2) through winding 11 at the No. 12 digit level, conductor 20, contacts R1*b*, conductor 34, emitter contact 33 in the No. 12 position, emitter brush 35, and contacts CF36 to the negative potential source 37. The ampere turns developed in each of the windings 11 and 12 is sufficient to produce individually an M. M. F. of +H. Coincident application of pulses to both windings produces an M. M. F. or +2H and core 10 is caused to traverse its hysteresis curve from point "*a*," indicating a "zero," to point "*b*" and, as the pulses are terminated, returns to point "*c*" indicating a "one." The "twelve" read from the record card is now stored and may be read out of storage at leisure by a manifesting unit before sensing a succeeding card.

The manifesting unit may be any device, such as a punch, which operates when subjected to timed pulses from the storage device for producing a desired function. This unit is represented in Fig. 2 by magnets 40, one for each column of cores 10. Each of the magnets may operate a punch element, not shown, to punch a record which is advanced past the punch elements in synchronism with the reading out of information stored in the cores 10 of each column.

Read out is accomplished by application of a current pulse to the digit level windings 11 in a direction contrary to that employed for the read in operation. The magnitude of the pulse is sufficient to produce an M. M. F. of −2H so that any core in which a "one" has been stored will traverse its hysteresis loop and transfer to a "zero" state. This flux change induces a voltage in winding 12 for effecting an energizing of the magnet 40 associated therewith in a manner to be described shortly. By applying read out pulses to the digit level windings 11 at different times during a read out cycle, the magnets 40 may be energized at times representative of the information stored.

Figure 1:
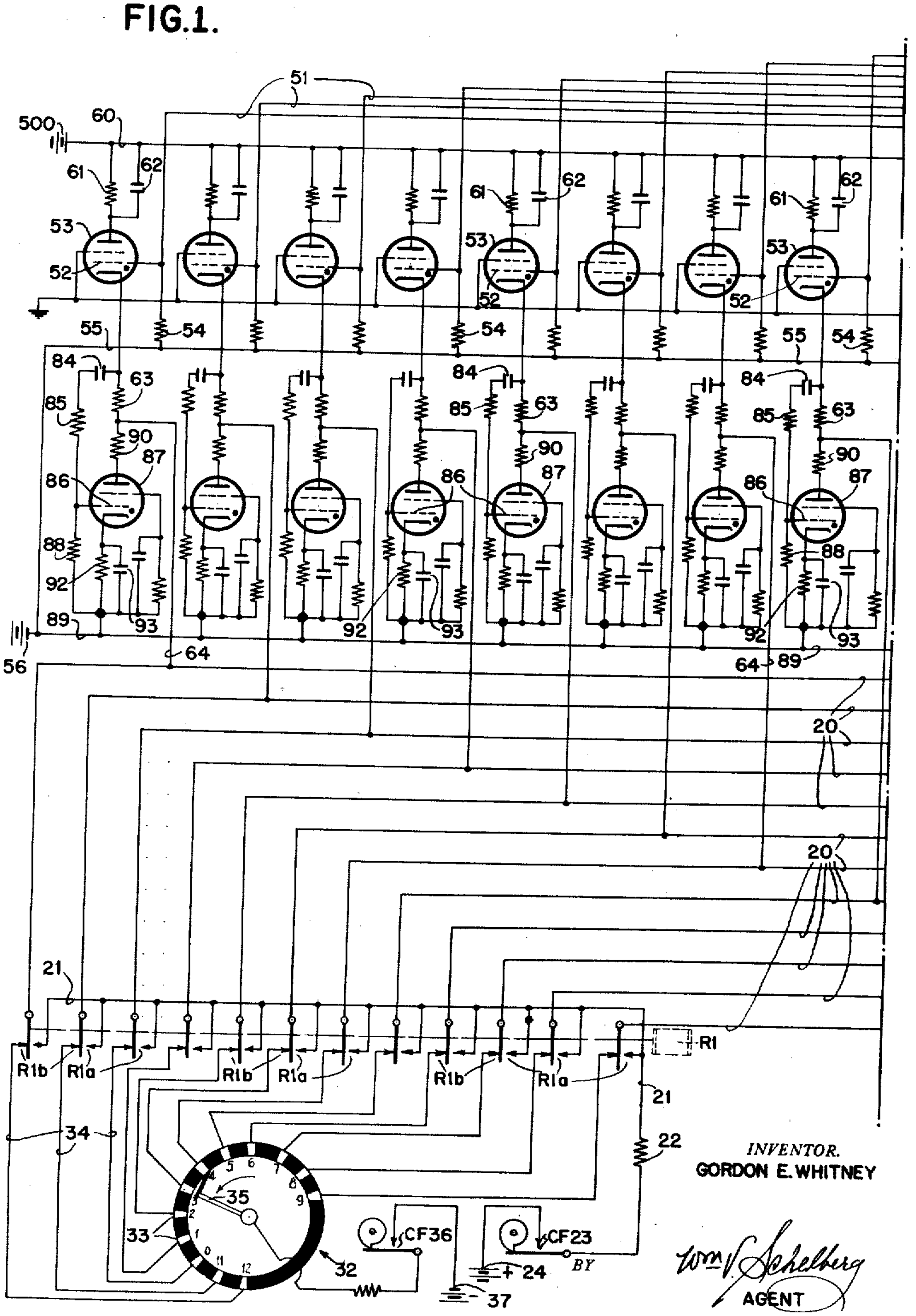

At the beginning of each read out cycle, read-out cam contacts R041 (Fig. 2) are closed to complete a circuit from the positive potential source 6 through a conductor 42 and a resistor 43 to a ground connection 44. The resistor 43 is also connected, as shown, through a condenser 46 to the contact arm 47 of an emitter 48 and to ground through a resistor 49. Each of the contacts 50 for the emitter 48 is connected through a conductor 51 to a control grid 52 of a thyratron 53, and through a resistor 54 to a conductor 55 which is connected to a negative potential source 56 (Fig. 1). The plate of each thyratron 53 is connected to a 500 volt line 60 through a resistor 61 and a condenser 62 connected in parallel. The cathode of each thyratron is connected through a resistor 63 and a conductor 64 to one of the conductors 20 which, in turn, is connected through one of the digit level windings 11 and the conductor 26 to ground.

Upon the closing of the cam contacts R041, a circuit is completed from the positive potential source 6 through the resistor 43 to ground, and the capacitor 46 is charged. As the contact arm 47 of the emitter 48 engages each of the contacts 50, the condenser 46 discharges so as to apply a positive pulse to the grid 52 of the corresponding thyratron 53. This causes the thyratron to fire and complete a circuit from the conductor 60 through the thyratron, the resistor 63, the conductors 64 and 20, the winding 11, and the conductor 26 to ground. The completion of this circuit produces a large negative M. M. F. which causes each core 10 in which a "one" is stored to traverse its hysteresis loop from point "*c*" to point "*d*," and the flux change in the core during this time induces a voltage pulse in the winding 12 of the core. The pulse through winding 11 exists until the transient current from the condenser 62 reaches a value too low to maintain conduction of the thyratron 53. Resistor 61 is of such a high value that insufficient current flows through it to maintain conduction through the tube and, therefore, the thyratron cuts off upon discharge of the condenser 62 and permits the core 10 to transfer from point "*d*" to point "*a*" on its hysteresis loop.

As soon as the reading of information from a card 1 into the cores 10 has been completed, the cam contacts CF30 (Fig. 3) open and remain open until another card is advanced past the sensing brushes 3. If desired, the feeding of cards to the sensing brushes may be discontinued while the information stored in the cores is repeatedly read out, as will be described. Since the contacts CF30 are open during this time, the relays R2 and R3 are deenergized so that their contacts R2*a* and R3*a* (Fig. 2) in each core column are in the lower normally closed positions, as shown. The contacts R2*a* in their lower positions are connected through a conductor 66 to a negative voltage bias source 67, and the contact R3*a* of each core column is connected in its lower position through a conductor 68 to the grid of a thyratron 69 as well as through a resistor 70 to a negative voltage bias source 71. The plate of each thyratron 69 is connected through a resistor 72 to a conductor 73 which is adapted to be connected by read-out cam contacts R075 to a conductor 76. Another circuit extends from the plate of each thyratron 69 through a plug wire 78, one of the magnets 40 and read-out cam contacts R076 to the conductor 76. The other end of the conductor 76 is connected through one of the cam contacts R041 and the conductor 42 to the voltage source 6.

The cam contacts R075 and R076 are operated in synchronism with the read-out emitter 48. As the brush arm 47 of the emitter engages each of its contacts 50, the cam contacts R075 and R076 close. These cam contacts open again as the brush arm moves out of engagement with each of its contacts 50. As described above, a pulse is delivered successively to the core windings 11 at the different digit level positions when the brush arm moves over the emitter contacts. If a "one" is stored in any one of the cores, then that core traverses its hysteresis loop when its winding 11 is pulsed. This causes a voltage to be induced in the winding 12 of the core, and the voltage is applied through the lower contacts R3*a* and the conductor 68 to the grid of the associated thyratron 69. The thyratron then fires and completes circuits from the grounded cathode of the tube through the parallel circuits including the cam contacts R075 and R076 to the conductor 76 which is connected through one of the cam contacts R041 and the conductor 42 to the voltage source 6. The parallel circuit through the contacts R075 includes the resistor 72 which is of a much higher ohmic value than the magnet 40 in the other parallel circuit, and, therefore, the magnet is energized to perform the function for which it is intended. It will be appreciated that the energizing of the magnet occurs at a time representative of the digit level of the core from which information is read. After a pulse has been delivered to the winding 11 of each core in a column, the cam contacts R075 and R076 are opened to extinguish the thyratron 69 if the latter has been fired. This conditions the thyratron for reading out information from the core at the next digit level position.

As mentioned above, means are provided for restoring information to each core from which information is read out. This makes it possible to read the same information repeatedly, if desired. The restoring means includes a circuit connected between the grid and plate of each thyratron 69 and having a resistor 80 and a condenser 81. Just before the thyratron fires, the condenser 81 is charged to a high potential through the resistor 72. When the thyratron fires, a discharge path is provided through the thyratron to ground and then through the bias voltage source 67, the conductor 66, lower cam contacts R2*a*, the core windings 12, the lower contacts R3*a* and the resistor 80 to the other terminal of the condenser 81. This discharge current flows in a read-in direction and is of sufficient magnitude to apply an M. M. F. of +H to the cores 10.

In order that the core may traverse its hysteresis loop from its "zero" condition (point *a*) after read-out to its "one" condition (point *c*), the condition in which it was in if information was stored, then an M. M. F. of +2H must be applied to the core that is being restored. Upon the reading out of information from any one core in a column, a discharge is obtained from the condenser 81 through the circuit mentioned above to apply an M. M. F. of +H to each of the cores in the column. The remaining M. M. F. of +H is applied successively to the cores by means which will now be described.

As the brush of the read-out emitter 48 engages each of the contacts 50, the thyratron 53 associated therewith is caused to fire, as described above, and complete a circuit through the resistor 63, the conductors 64, 20 and the core winding 11 to the grounded conductor 26. This causes a voltage to be developed across the resistor 63. Connected to the resistor 63 adjacent the cathode of the tube 53 is a circuit including a condenser 84, a resistor 85 and the grid 86 of a thyratron 87. The grid is also connected through a resistor 88 and a conductor 89 to the negative potential source 56. The plate of the thyratron 87 is connected through a resistor 90 to the conductor 64, and the cathode is connected through a resistor 92 and a condenser 93 in parallel to the conductor 89. The voltage developed across the resistor 63 by the firing of the tube 53 causes the condenser 84 to be charged and a positive pulse to be applied to the grid 86. The thyratron 87 fires shortly after the thyratron 53 cuts off, as determined by the relative values of the circuit components, and completes a circuit from the potential source 56 through the thyratron 87, the resistor 90, the conductors 64, 20 and the core windings 11 to the grounded conductor 26. A current flows through this circuit in the same direction as the read-in pulse and causes an M. M. F. of +H to be applied to all of the cores in the digit level. The resistor 92 in the cathode circuit of the thyratron 87 is of high ohmic value so that insufficient current flows through the tube 87 to maintain it conductive after the transient current from the condenser 93 drops to a low value.

If information is read out of any one of the cores in the digit level in which the windings 11 are pulsed from the thyratrons 87, then the windings 12 in the columns including these cores are also pulsed, as described above, and a total M. M. F. of +2H is applied to the cores from which information was read. This causes the cores to be returned to the condition in which they were placed by the original reading of information from a card. Each time that information stored in cores is read out, the information is restored to the cores so that the read-out operation can be repeated if desired. When it is desired to read information from another card into the cores, a card feed cycle is started to advance another card to the sensing brushes 3. Before the card reaches the brushes, the card feed contacts CF14 (Fig. 3) are closed to energize the relay R1. This causes the relay contacts R1*a* (Fig. 1) to be closed for pulsing the windings 11 to restore all of the cores to their "zero" condition, as described above.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a two dimensional saturable magnetic core storage device, a plurality of core elements having a threshold coercive force arranged in N columns of M cores, first windings embracing the cores in individual columns, second windings individually embracing the first through the Mth row of cores, first means for sequentially energizing said second windings with a current effective to develop a magnetomotive force less than said threshold coercive force, means for selectively energizing said first windings with a current effective to develop a magnetomotive force less than said threshold coercive force and in coincidence with the sequential energization of said second windings so as to cause a change in the state of magnetization of those cores subjected to coincident energization, second means for selectively energizing said second windings with a current effective to develop a magnetomotive force greater than said threshold coercive force and in a direction contrary to that of said first means and means for sensing a change in the state of magnetization of said core elements.

2. Apparatus as in claim 1 in which said means for sensing a changed state of magnetization includes means for detecting a voltage pulse induced in said first windings on reversal of the state of magnetization of a core element in response to operation of said second means.

3. Apparatus as in claim 2 including in addition N manifesting units, one for each column of cores, and means for operating said manifesting units in response to detection of said induced voltage pulses.

4. Apparatus set forth in claim 3 including read back means coupled with said second windings and adapted to cause current flow therein in a read in direction, and means coupled with said first windings to cause current flow therein in the read-in direction in response to detection of said induced voltage pulses.

5. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage unit including a plurality of magnetic core elements having a substantially rectangular hysteresis characteristic, one element being provided for each character in each column, a first winding embracing core elements of each column, a second winding embracing each element representing like characters in all columns, means connecting said first winding and said corresponding column sensing means in series with a voltage source so that said first winding is energized on sensing a perforation in a record, read in means connecting said second windings with a voltage source and operable to energize said second windings at each character level concurrently with sensing of like record character levels, coincident energization of said first and second windings causing a change in the magnetic state of said core elements, means coupled with said second windings for initially magnetizing all said cores to a uniform state, means coupled with said second windings for periodically energizing said second windings with a current pulse sufficient to cause a change in the magnetic state of said core elements and in a direction contrary to read in, means including an electron discharge device coupled with said first windings and rendered conductive in response to a voltage induced therein on contrary energization of said second windings, a plurality of manifesting units, one provided for each column of characters and means for controlling said manifesting units in response to conductivity of said discharge device.

6. Apparatus as set forth in claim 5 including read back means coupled with said second windings and adapted to cause current flow in a read in direction, and means coupled with said electron discharge device and said first winding for causing current flow in a read in direction in response to firing of said discharge device.

7. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage unit including a plurality of magnetic core elements having a substantially rectangular hysteresis characteristic, one element being provided for each character in each column, a first winding passing through the core elements of each column, a second winding passing through core elements representing like characters in each column, means connecting said first winding and the corresponding one of said column sensing means in series with a voltage source so that said first winding is energized on sensing a perforation in a record, read in means for energizing said second windings periodically at each character level concurrently with the sensing of like character levels of record perforations, read out means for energizing said second windings periodically at each character level with a current sufficient to cause a change in the remanence state of the core elements and in a direction contrary to read in, means coupled with said first windings and operable to detect a voltage impulse induced therein in response to operation of said read out means.

8. Apparatus as in claim 7 including a manifesting unit for each column of cards and means for operating said manifesting units in response to detection of said voltage impulses.

9. Apparatus as in claim 7 including means coupled with said second windings for magnetizing all said cores to a uniform initial state prior to read in.

10. Apparatus as in claim 7 including read back means coupled with said second windings and adapted to cause current flow in a read in direction and means coupled with said first winding and operable to cause current flow in a read in direction in response to detection of said induced voltage impulse.

11. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage device including a plurality of magnetic core elements having a substantially rectangular hysteresis characteristic, one element being provided for each character in each column, a first set of windings passing through the core elements of each column, a second set of windings passing through the core elements representing like characters in each column, means for energizing said second set of windings and magnetizing all said cores to a uniform initial state, means connecting said first set of windings with corresponding column record sensing means for energization with a half select write current pulse on sensing a perforation in a record sheet, read in means for periodically energizing said second set of windings with a half select write current pulse at each character level concurrently with sensing of like character levels of perforations of said record sheet, read out means for energizing said second set of windings with a full read select pulse periodically at each character level, means coupled with said first windings and operable to detect a voltage impulse inducted therein in response to operation of said read out means, manifesting units for each column of cores, means for operating said manifesting units in response to detection of voltage impulses induced in said first set of windings, read back means coupled with said second set of windings and adapted to periodically energize said second set of windings with a half select write current pulse and further means coupled with said first set of windings and adapted to cause a half select write current flow therein in response to detection of induced voltage impulses.

12. A device for storing information sensed at index points arranged in columns on a card comprising, in combination, a plurality of magnetic core elements, one for each index point, arranged in columns corresponding to said card columns, said cores being magnetizable in one direction to represent a binary "zero" and magnetizable in the opposite direction to represent a binary "one," a first set of windings individually embracing each column of cores, a second set of windings individually embracing cores at corresponding positions in said columns, sensing means engageable successively with the card index points in each column and operating upon the sensing of information at any point for energizing the winding of said first set of windings embracing the column of cores corresponding to the card column in which the information was sensed, first means for energizing the windings of said second set successively and in synchronism with the engagement of said sensing means with index points at corresponding positions on said card, each of said cores being magnetized in a direction to represent a binary "one" only when both of the windings embracing it in said first and second sets are energized second means for successively energizing said second set of windings with a current sufficient alone to magnetize said cores in a binary "zero" direction, and means for sensing a change in magnetization of said cores from a binary "one" to a binary "zero" state.

13. A device for storing information sensed at index points arranged in columns on a record sheet comprising in combination, a plurality of magnetic core elements having a substantially rectangular hysteresis characteristic, one for each index point, arranged in columns corresponding to said record columns, said cores being magnetizable in one sense to represent a binary "zero" and in the opposite sense to represent a binary "one," a first group of windings individually comprising a plurality of single turns common to all the cores in each column, a second group of windings comprising a single turn common to cores at corresponding positions in said columns, sensing means engageable successively with the record index points in each column and energizing the windings of said first group upon sensing information at index points in correspondin.; columns, means for energizing the windings of said second group successively and in synchronism with the sensing of corresponding index points on said record, each of said cores being magnetized in a sense to represent a binary "one" only when both windings embracing it in said first and second groups are concurrently energized, and means for initially energizing said second group of windings to simultaneously magnetize all of said cores in a sense to represent a binary "zero" prior to sensing information from a record.

14. A device for storing information sensed at index points arranged in columns on a record card comprising, in combination, a plurality of magnetic core elements having a substantially rectangular hysteresis characteristic, one for each index point, arranged in columns corresponding to said card columns, said cores being magnetizable in one direction to represent a binary "zero" and in the opposite direction to represent a binary "one," a first set of windings individually comprising a plurality of single turns embracing all the cores in each column, a second set of windings individually embracing cores at corresponding positions in said columns, sensing means engageable successively with the card index points in each column and operating upon the sensing of information at any point for energizing in a first direction, the winding of said first set of windings embracing the column of cores corresponding to the card column in which the information was sensed, means for energizing the windings of said second set successively in a first direction and in synchronism with the engagement of said sensing means with index points at corresponding positions on said card, each of said cores being magnetized in a direction to represent a binary "one" when both of the windings embracing it in said first and second sets are energized, read-out means for successively energizing said second set of windings at each corresponding index position in a second direction, means including a thyratron coupled with individual windings of said first set of windings and rendered conductive in response to a voltage impulse induced therein on operation of said read-out means, and means including a capacitor element coupled with each said thyratron and discharged through said thyratron and corresponding winding of said first set of windings in a first direction on conduction of said thyratron, and means responsive to operation of said read out means for energizing said second set of windings at each index position in a first direction whereby upon energization of said second windings by said latter means and coincident energization of said first set of windings by said condenser discharge, each of said cores in which a "one" had been stored is again magnetized in a direction to represent a binary "one."

15. A magnetic memory device comprising a coordinate array of saturable magnetic cores each having a substantially rectangular hysteresis characteristic with a coercive force threshold, winding means on said cores including first winding means embracing individual groups of said cores along one coordinate direction and second winding means embracing indivdiual groups of said cores along another coordinate direction, first means for energizing selected ones of said second winding means with a current pulse effective to develop a magnetomotive force less than said threshold coercive force in the cores linked thereby, means for energizing selected ones of said first winding means with a current pulse effective to develop a magnetomotive force less than said threshold coercive force in the cores linked thereby whereupon coincident energization of one of said first winding means and one of said second winding means is effective to cause a change in the state of magnetization of a core jointly acted upon, second means for energizing selected ones of said second winding means with a current pulse in a direction contrary to that of said first means and effective to develop a magnetomotive force greater than said threshold coercive force, and means coupled with said winding means for sensing a change in the state of magnetization of said cores on operation of said second means.

16. A magnetic memory device comprising a coordinate array of saturable magnetic cores each having a substantially rectangular hysteresis characteristic with a coercive force threshold, winding means on said cores including first winding means inductively associated with individual groups of said cores along one coordinate direction of said array and second winding means inductively associated with individual groups of said cores along another coordinate direction of said array, a source of differentially timed electrical impulses wherein the time of delivery of said impulses represents a digital value, said source being coupled to individual ones of said first winding means and effective to develop a magnetomotive force less than said coercive force threshold in the cores linked thereby, first means for successively energizing individual ones of said second winding means in synchronism with said source of differentially timed impulses and effective to develop a magnetomotive force less than said coercive force in the cores linked thereby, coincident energization of the windings jointly linking one core being effective to cause a change in the state of magnetization thereof, second means for successively energizing individual ones of said second winding means in a direction opposite to said first means and effective to develop a magnetomotive force greater than said threshold coercive force in the cores linked thereby, and means coupled with said winding means for sensing a change in the state of magnetization of said cores on operation of said second means.

17. A device for storing information comprising a plurality of magnetic core elements having a substantially rectangular hysteresis characteristic, said cores being arranged in a coordinate array of rows and columns and magnetizable in one direction to represent a binary "zero" and in the opposite direction to represent a binary "one," a first set of windings individually embracing all the cores in each column, a second set of windings embracing cores at corresponding positions in said columns, means for selectively energizing the windings of said first set in a first direction, means for successively energizing the windings of said second set in a first direction whereupon each of said cores are magnetized in a direction to represent a binary "one" when both of the windings in said first and second set embracing it are energized, read-out means for successively energizing said second set of windings individually in a second direction, means including a thyratron coupled with individual windings of said first set and rendered conductive in response to a voltage impulse induced therein on operation of said read-out means, and means including a capacitor element coupled with each said thyratron and discharged through said thyratron and the corresponding winding of said first set of windings in a first direction on conduction of said thyratron, and means responsive to operation of said read-out means for successively energizing said second set of windings in a first direction whereby upon energization of said second windings by said latter means and coincident energization of said first set of windings by said condenser discharge, each of said cores in which a "one" had been stored is again magnetized in a direction to represent binary "one."

18. A device for storing information comprising a magnetic core having a substantially rectangular hysteresis characteristic and magnetizable in one direction to represent a binary "one" and in the opposite direction to represent a binary "zero," first and second winding means embracing said core, means for selectively energizing said first winding means in a first direction, read-in means for energizing said second winding means in a first direction whereupon said core is magnetized in a direction to represent binary "one" when both said winding means are energized, read-out means for energizing said second winding means in a second direction, means including a thyratron discharge device coupled to said first winding means and rendered conductive in response to a voltage impulse induced therein on operation of said read-out means, and means including a capacitor coupled with said thyratron and discharged through said thyratron and said first winding means in a first direction on conduction of said thyratron, and means responsive to operation of said read-out means for energizing said second winding means in a first direction whereby upon energization of said second winding means by said latter means and coincident energization of said first winding means by said condenser discharge, said core is again magnetized in a direction to represent binary "one" when a "one" had been stored.

References Cited in the file of this patent

UNITED STATES PATENTS

| | | |
|---|---|---|
| 2,547,482 | McKiever | Apr. 3, 1951 |
| 2,573,561 | Furman | Oct. 30, 1951 |
| 2,696,600 | Serrell | Dec. 7, 1954 |
| 2,718,356 | Burrell et al. | Sept. 20, 1955 |
| 2,719,965 | Person | Oct. 4, 1955 |

OTHER REFERENCES

Static Magnetic Matrix Memory etc., by J. A. Rajman, RCA Review for June 1952, pages 183–201.

Static Magnetic Memory etc., by An Wang, Proceeding of the Assoc. of Computing Machinery, May 1952, pages 207–212.

Publication: Proc. Assoc. Comp. Mach., May 1952, pp. 213–222.

Thesis: M. K. Haynes, "Magnetic Cores as Elements of Digital Computing Systems," pp. 21–28, December 1950.

Edvac Progress Report No. 2; June 30, 1946, pp. 4–23, PY–0–164, PY–0–165.

Digital Information Storage etc., by J. W. Forrester, Journal of Applied Physics, vol. 22, No. 1, pages 44–48, January 1951.

A Coincident Current Magnetic Memory, by W. N. Papian, Proceedings of the IRE, April 1952, pp. 475–478.